United States Patent
Hayakawa et al.

(10) Patent No.: US 8,033,189 B2
(45) Date of Patent: Oct. 11, 2011

(54) ROBOT SKIN

(75) Inventors: Masato Hayakawa, Wako (JP); Kazuyuki Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 504 days.

(21) Appl. No.: 12/087,000

(22) PCT Filed: Dec. 27, 2006

(86) PCT No.: PCT/JP2006/326160
§ 371 (c)(1), (2), (4) Date: Jun. 24, 2008

(87) PCT Pub. No.: WO2007/074891
PCT Pub. Date: Jul. 5, 2007

(65) Prior Publication Data
US 2009/0158864 A1 Jun. 25, 2009

(30) Foreign Application Priority Data
Dec. 28, 2005 (JP) .................................. 2005-379229

(51) Int. Cl.
*G01L 5/22* (2006.01)
*B25J 19/02* (2006.01)
(52) U.S. Cl. ......................................... 73/865.7; 901/46
(58) Field of Classification Search ................. 73/865.7; 901/1, 46
See application file for complete search history.

(56) References Cited

U.S. PATENT DOCUMENTS

| | | | | |
|---|---|---|---|---|
| 4,555,953 A * | 12/1985 | Dario et al. | ............... | 73/865.7 X |
| 4,817,440 A * | 4/1989 | Curtin | ........................ | 901/46 X |
| 5,261,266 A * | 11/1993 | Lorenz et al. | .................. | 73/1.15 |
| 5,313,840 A * | 5/1994 | Chen et al. | ...................... | 73/763 |
| 5,911,694 A * | 6/1999 | Ikeda et al. | .................... | 600/587 |
| 6,286,226 B1 * | 9/2001 | Jin | ................... | 33/706 |
| 6,538,410 B2 * | 3/2003 | Mori et al. | ..................... | 901/1 X |

(Continued)

FOREIGN PATENT DOCUMENTS
DE         10252862 B3 *   7/2004
(Continued)

OTHER PUBLICATIONS

Japanese Office Action, Japanese Patent Application No. 2006-353493, Date of Mailing: Dec. 21, 2010, pp. 1-2, English Translation: pp. 1-2.

*Primary Examiner* — Thomas P Noland
(74) *Attorney, Agent, or Firm* — Squire, Sanders & Dempsey (US) LLP

(57) ABSTRACT

In a skin of a robot, it is configured to have a plurality of tactile sensors discretely installed on a base, a first member disposed on the tactile sensors, the first member being continuously formed, at its surface facing the tactile sensors, with projections which are tapered toward the respective tactile sensors as viewed in cross-section to be capable of pressing each of the tactile sensors, and a second member that is disposed on the first member and is made of a material being lower in rigidity than a material of the first member. With this, the skin is equipped with the second member as a soft skin surface and it becomes possible to reliably detect a point of action or distribution of a load applied through the skin surface, thereby enabling to reliably estimate a point in contact with an external object.

7 Claims, 14 Drawing Sheets

U.S. PATENT DOCUMENTS

| | | | |
|---|---|---|---|
| 6,915,701 B1 * | 7/2005 | Tarler | 73/774 |
| 7,549,688 B2 * | 6/2009 | Hayakawa et al. | 901/33 X |
| 7,658,119 B2 * | 2/2010 | Loeb et al. | 901/46 X |
| 7,673,528 B2 * | 3/2010 | Yoon et al. | 73/862.041 |
| 2003/0199116 A1* | 10/2003 | Tai et al. | 438/53 |
| 2005/0021247 A1* | 1/2005 | Liu et al. | 702/42 |
| 2009/0272201 A1* | 11/2009 | Loeb et al. | 73/862.041 |
| 2010/0139418 A1* | 6/2010 | Loeb et al. | 73/862.046 |

FOREIGN PATENT DOCUMENTS

| | | | |
|---|---|---|---|
| DE | 202005002475 U1 * | 7/2006 | |
| JP | 60-117092 U | 8/1985 | |
| JP | 61-288991 A | 12/1986 | |
| JP | 62-88929 U | 6/1987 | |
| JP | 63-89282 A | 4/1988 | |
| JP | 63-103995 U | 7/1988 | |
| JP | 04057695 A * | 2/1992 | |
| JP | 7-8477 B2 * | 1/1995 | |
| JP | 09329513 A * | 12/1997 | |
| JP | 2001054891 A * | 2/2001 | |
| JP | 2001-116635 A | 4/2001 | |
| JP | 2001-239479 A | 9/2001 | |
| JP | 2002-116100 A | 4/2002 | |
| JP | 2004230532 A * | 8/2004 | |
| JP | 2004283975 A * | 10/2004 | |
| JP | 2005003649 A * | 1/2005 | |
| JP | 2005088096 A * | 4/2005 | |
| JP | 2006281347 A * | 10/2006 | |
| WO | WO 2009124209 A1 * | 10/2009 | |

* cited by examiner

| | POSITION (ABOVE 52-7 IS 0) [mm] | 52-7 Ve-V7[V] | 52-8 Ve-V8[V] | ESTIMATED POSITION OF CONTACT POINT [mm] |
|---|---|---|---|---|
| ABOVE 52-7 | 0 | 3.1 | 0.1 | 0.1 |
| | 1 | 2.5 | 0.5 | 0.7 |
| | 2 | 1.9 | 1.9 | 2.0 |
| | 3 | 0.6 | 2.3 | 3.2 |
| ABOVE 52-8 | 4 | 0.1 | 2.6 | 3.9 |

$$x = 4 \times \frac{Ve-V8}{(Ve-V7)+(Ve-V8)}$$

$$(X_p, Y_p) = \left( \frac{\sum_{i=1}^{Nx}\sum_{j=1}^{Ny} P_i F_{ij}}{\sum_{i=1}^{Nx}\sum_{j=1}^{Ny} F_{ij}}, \frac{\sum_{i=1}^{Nx}\sum_{j=1}^{Ny} P_j F_{ij}}{\sum_{i=1}^{Nx}\sum_{j=1}^{Ny} F_{ij}} \right)$$

ROBOT SKIN

TECHNICAL FIELD

This invention relates to a skin of a robot.

BACKGROUND ART

Conventionally, as disclosed in Patent Reference 1, there is proposed a robot skin equipped with tactile sensors discretely allocated at intervals on a base, an internal skin (first member) made of a high-stiffness material that is located on the tactile sensors to fully cover them and an external skin (second member) made of a low stiffness material having high coefficient of friction that is located on the internal skin to cover it, which is configured to use the tactile sensors to detect a load generated by a contact with an external object through the internal skin.

Patent Reference 2 discloses a robot skin that is equipped with matrix-arranged tactile sensors installed on an outer surface (base) and a pseudo skin (first member) made of silicon and located on the tactile sensors, and is configured to detect a load generated by a contact with an external object based on changing amount of capacitance. In the technique taught in Patent Reference 2, the pseudo skin is bored by holes of convex shape in section at a layer above a sensing point where comb electrodes of the tactile sensors intersect, projections having the same shape are each inserted therein, and ends of the projections are projected from the pseudo skin surface to be able to contact with an external object, such that a load from the external object acts on the sensing point through the projections.

Patent Reference 1: Japanese Patent Publication Hei 7 (1995)-8477

Patent Reference 2: Japanese Laid-Open Patent Application No. 2004-230532

DISCLOSURE OF THE INVENTION

Problems to be Solved by the Invention

A robot skin is required to have a soft skin surface composed of an external skin or pseudo skin and at the same time, to be reliably able to detect a load applied through the skin surface. In the prior art taught in Patent Reference 1, however, since the internal skin is disposed to cover the whole tactile sensors that are discretely allocated on the base, a load generated due to a contact with the external object is dispersed and a point of action or distribution of the load can not be reliably detected. It leads to a disadvantage in that the estimation accuracy of a point in contact with the external object is not satisfactory. Further, in the prior art set out in Patent Reference 2, a dead zone is made between the sensing points, resulting in the same disadvantage.

An object of this invention is therefore to overcome the aforesaid drawback by providing a skin of a robot that is equipped with a soft skin surface and can reliably detect a point of action or distribution of a load applied through the skin surface, thereby enabling to reliably estimate a point in contact with an external object.

Means for Solving the Problems

In order to achieve the object, an embodiment of this invention is configured to have a robot skin comprising: a plurality of tactile sensors discretely installed on a base; a first member disposed on the tactile sensors, the first member being continuously formed, at its surface facing the tactile sensors, with projections which are tapered toward the respective tactile sensors as viewed in cross-section to be capable of pressing each of the tactile sensors; and a second member that is disposed on the first member and is made of a material being lower in rigidity than a material of the first member.

An embodiment of this invention is configured to have a robot skin comprising: a plurality of tactile sensors discretely installed with respect to a base; a first member that is continuously formed, at its surface facing the tactile sensors, with projections which are tapered toward the respective tactile sensors as viewed in cross-section to be capable of pressing each of the tactile sensors; a second member that is made of a material being lower in rigidity than a material of the first member and surrounds the first member for supporting; and a fixture that fixes the second member to the base.

An embodiment of this invention is configured such that the projections are each provided at its end with a pressing portion of an area which is equal to or greater than that of an electrode of each of the tactile sensors.

An embodiment of this invention is configured such that each of the projections has a cone shape or a hemisphere shape.

An embodiment of this invention is configured such that a third member made of a material being lower in rigidity than the material of the first member is installed between the first member and the tactile sensors.

An embodiment of this invention is configured such that a top surface of the second member is applied with a coating material that differs in coefficient of friction from the material of the second member.

An embodiment of this invention is configured such that a pressing portion of the projection is made of a conductive rubber material.

Effects of the Invention

In one embodiment of the robot skin, it is configured to have a robot skin comprising a plurality of tactile sensors discretely installed on a base, a first member disposed on the tactile sensors, the first member being continuously formed, at its surface facing the tactile sensors, with projections which are tapered toward the respective tactile sensors as viewed in cross-section to be capable of pressing each of the tactile sensors, and a second member that is disposed on the first member and is made of a material being lower in rigidity than a material of the first member. With this, the skin is equipped with the second member as a soft skin surface and it becomes possible to reliably detect a point of action or distribution of a load applied through the skin surface, thereby enabling to reliably estimate a point in contact with an external object.

In other words, in order to reliably detect a load applied to the second member (soft skin surface), it is necessary to make a load act on a sensing point (electrode) of the tactile sensor without spreading. In an embodiment, since it is configured to have the first member formed with the projections which are tapered toward the tactile sensors as viewed in cross-section on the tactile sensors, when a load is applied to the second member installed on the first member, the generated internal stress can be concentrated on the sensing point of the tactile sensor.

Realistically, it is impossible to dispose innumerable tactile sensors, so a finite number of tactile sensors are allocated discretely, i.e., positioned at appropriate intervals. However, if a dead zone is generated, it deteriorates the detection accuracy. Yet, in this embodiment, since it is configured such that the tapered projections are continuously formed to be capable of pressing each of the tactile sensors, the load applied to a position between one tactile sensor and an adjacent tactile sensor can be distributed to the two tactile sensors, and based on the distribution condition, it is possible to detect a point to which a load is applied between the sensors.

As a result, in an embodiment of the robot skin, it becomes possible to reliably detect a point of action or distribution of a load applied through the second member (skin surface), thereby enabling to reliably estimate a point in contact with an external object. Further, since it is configured to have the second member (skin surface), it becomes possible to mitigate impact caused by a contact with an external object and an area in contact can be enlarged, thereby facilitating grasping of a work (external object) when, for instance, the robot is a humanoid robot having a human shape and the skin is used for its hand.

In one embodiment of the robot skin, it is configured to have a robot skin comprising a plurality of tactile sensors discretely installed with respect to a base, a first member that is continuously formed, at its surface facing the tactile sensors, with projections which are tapered toward the respective tactile sensors as viewed in cross-section to be capable of pressing each of the tactile sensors, a second member that is made of a material being lower in rigidity than a material of the first member and surrounds the first member for supporting, and a fixture that fixes the second member to the base. With this, when a load is applied to the second member, the generated internal stress can be concentrated on the sensing point of the tactile sensor through the first member formed with the projections which are tapered toward each of the tactile sensors as viewed in cross-section, thereby enabling to reliably estimate a point in contact with an external object.

Further, since it is configured to have the second member that surrounds the first member for supporting and the fixture that fixes the second member to the base, the second member can be firmly fixed to the base and the first member can be provided with a certain extent of degree of freedom with respect to the base.

Further, since it is configured to have the second member, it becomes possible to mitigate impact caused by a contact with an external object and an area in contact can be enlarged, thereby facilitating grasping of a work (external object) when, for instance, the robot is a humanoid robot having a human shape and the skin is used for its hand. More specifically, when a work is large, by holding along the surface of the work and when a work is small, by wrapping, the hand can surely grasp the work. Furthermore, since the second member is made of a material being lower in rigidity than a material of the first member, it increases a contact area, thereby more reliably grasping an object.

In an embodiment of the robot skin, since it is configured such that the projections are each provided at its end with a pressing portion of an area which is equal to or greater than that of an electrode of each of the tactile sensors, in addition to the above effects, it becomes possible to press the entire electrode of the tactile sensor even when displacement occurs, thereby enabling to further reliably detect a load.

In an embodiment of the robot skin, it is configured such that each of the projections has a cone shape or a hemisphere shape. Since there does not exist a ridge line on which stress tends to be concentrated when a load is applied to the second member disposed on the first member, in addition to the above effects, the generated internal stress can be further surely concentrated on the tactile sensors.

In an embodiment of the robot skin, since it is configured such that a third member made of a material being lower in rigidity than the material of the first member is installed between the first member and the tactile sensors, the stress (load) concentration through the projections can be further ensured. It should be noted that the second member may function as the third member.

In an embodiment of the robot skin, since it is configured such that a top surface of the second member is applied with a coating material that differs in coefficient of friction from the material of the second member, in addition to the above effects, it becomes possible to easily change the coefficient of friction of the outer surface of the skin.

In an embodiment of the robot skin, since it is configured such that a pressing portion of the projection is made of a conductive rubber material, in addition to the above effects, the skin can be low in height and, therefore, the structure can be compact.

BEST MODES OF CARRYING OUT THE INVENTION

Preferred embodiments for carrying out a robot skin according to the present invention will now be explained with reference to the attached drawings.

First Embodiment

Figure 1:
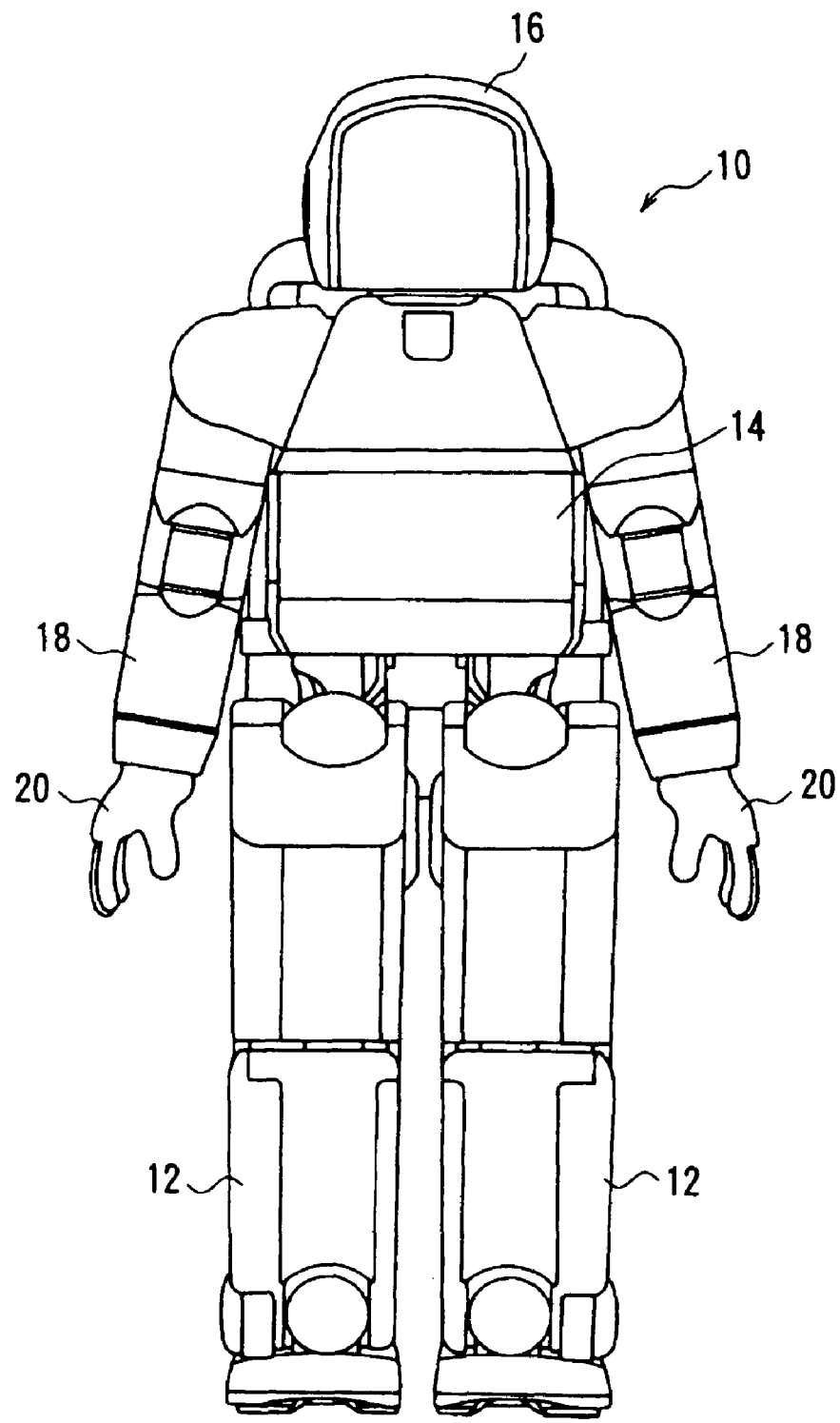
FIG. 1 is a front view of a robot to which a skin according to a first embodiment of the invention is applicable.
Figure 2:
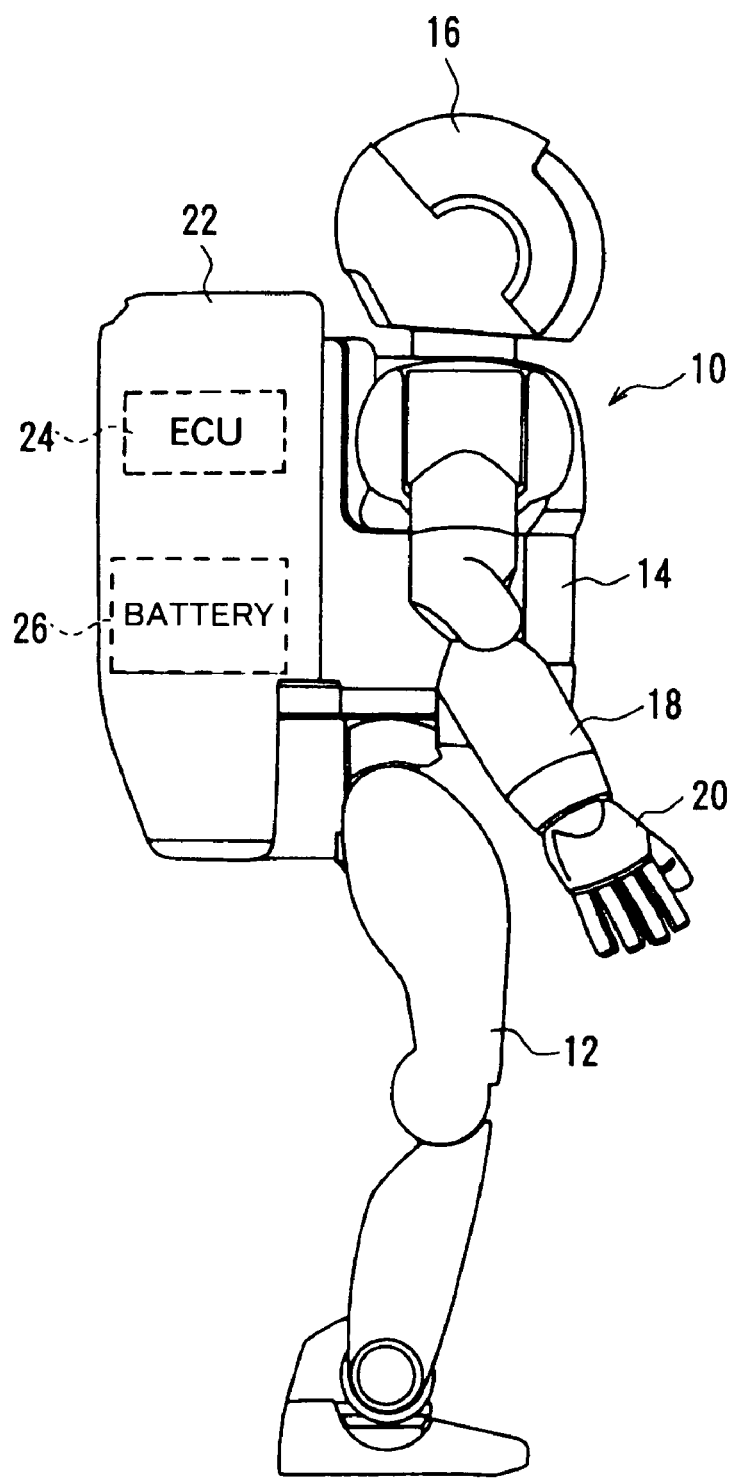
FIG. 2 is a right side view of the robot shown in FIG. 1.

FIG. 1 is a front view of a robot to which a robot skin according to a first embodiment of the invention is applicable and FIG. 2 is a right side view thereof.

As shown in FIG. 1, a robot 10 is equipped with two legs 12 and a body 14 above the legs 12. A head 16 is formed above the body 14 and two arms 18 are connected one to either side of the body 14. Hands 20 are attached to the distal ends of the right and left arms 18. As shown in FIG. 2, a housing unit 22 is mounted on the back of the body 14 that accommodates therein, an ECU (electronic control unit) 24, a battery 26, etc.

The right and left legs 12 of the robot 10 are each provided with 6 degrees of freedom, so that the legs as a whole can be imparted with desired movements by operating electric motors to drive the 6×2=12 joints based on control variables calculated by the ECU 24, thereby enabling the robot 10 to move in three-dimensional space arbitrarily. Further, the right and left arms 18 are each provided with 5 degrees of freedom, so that desired movements can be carried out by operating electric motors to drive the 5×2=10 joints based on control variables calculated by the ECU 24.

The right and left hands 20 are also each provided with 14 degrees of freedom, as will be explained later, so that desired movements such as grasping of a work (external object) can be carried out by operating electric motors to drive the 14×2=28 joints based on control variables calculated by the ECU 24. Thus the robot 10 is constituted as a humanoid robot having shape of a human and capable of autonomous locomotion.

Figure 3:
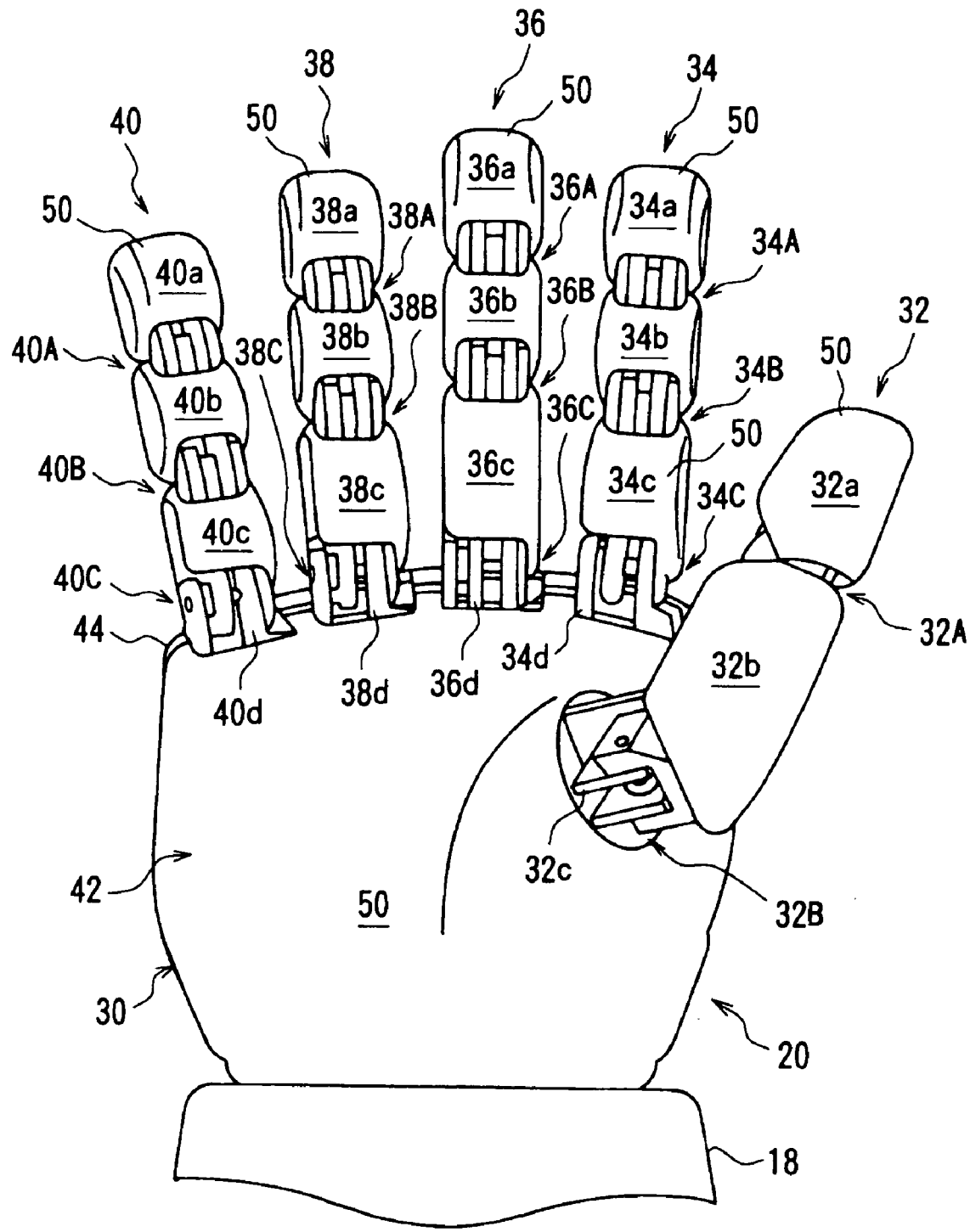
FIG. 3 is a plan view of a robot hand shown in FIG. 1 seen from the palm side.

FIG. 3 is a plan view of the hand 20 seen from the palm side.

As shown in FIG. 3, the hand 20 comprises a metacarpus 30, first to fifth fingers 32 to 40 connected to the metacarpus 30, a palm forming member 42 that forms the surface of the palm side and a back forming member 44 that forms the surface of the back of the hand. The proximal end of the hand 20 is connected to the arm 18. The first to fifth fingers 32 to 40 correspond to the thumb, index finger, middle finger, ring finger and little finger of a human hand. The metacarpus 30 is composed of the palm forming member 42 that forms the surface of the palm side and the back forming member 44 that forms the surface of the back of the hand.

The first to fifth fingers each comprises a plurality of finger links and finger joints interconnecting the links. Specifically, the first finger (thumb) 32 comprises a distal link 32a, a proximal link 32b, a first joint 32A connecting the two links, and a second joint 32B connecting the proximal link 32b and a metacarpus link 32c fixed at the metacarpus 30. The second finger (index finger) 34 comprises a distal link 34a, a middle link 34b, a proximal link 34c, a first joint 34A connecting the distal link 34a and middle link 34b, a second joint 34B connecting the middle link 34b and proximal link 34c, and a third joint 34C connecting the proximal link 34c and a metacarpus link 34d fixed at the metacarpus 30. The third finger 36, fourth finger 38 and fifth finger 40 are structured similarly to the second finger 34.

Figure 4:
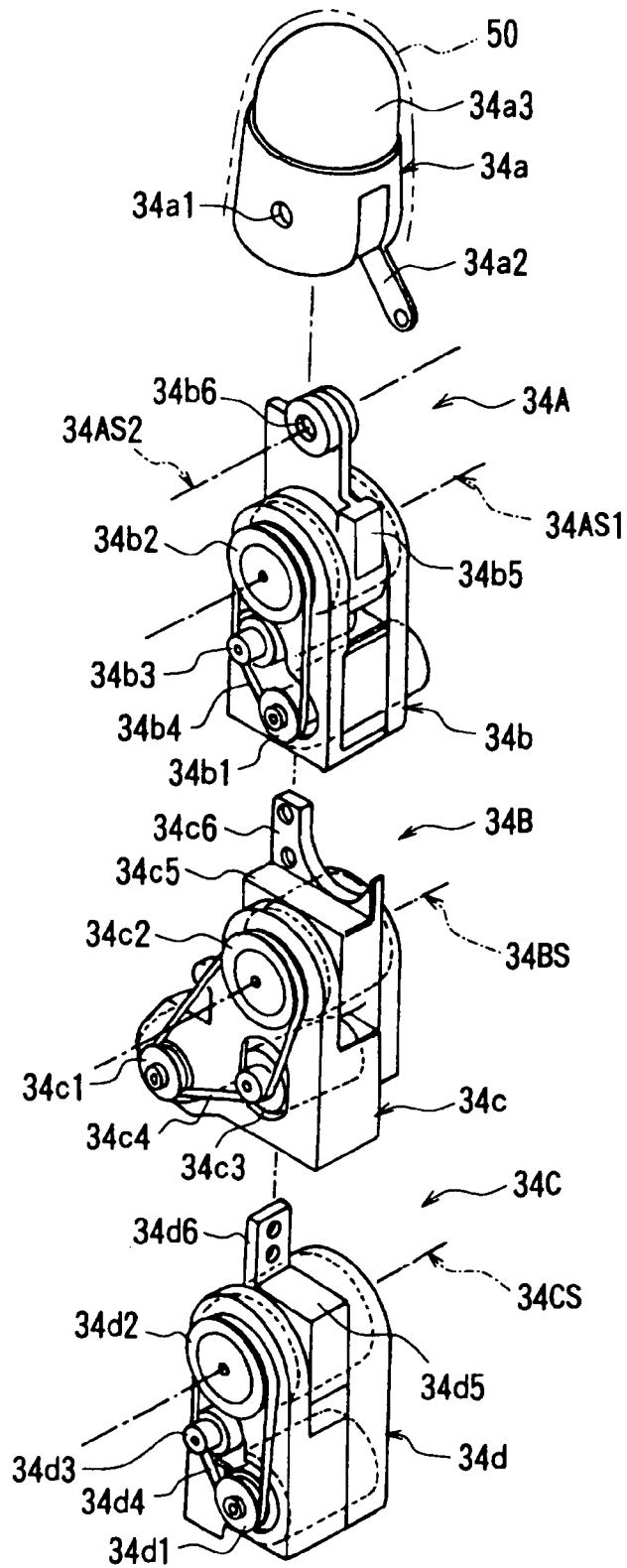
FIG. 4 is an enlarged exploded perspective view of a second finger shown in FIG. 3.

FIG. 4 is an enlarged exploded perspective view of the second finger 34.

As shown in FIG. 4, the metacarpus link 34d is provided with a first electric motor 34d1, a first reduction gear mechanism 34d2 having a planetary gear reducer for reducing speed of the motor output and other components and a first encoder 34d3 for detecting rotation angle (joint angle) of the third joint 34C. The output shaft of the first motor 34d1, the input shaft of the first reduction gear mechanism 34d2 and the rotation shaft of the first encoder 34d3 are connected to each other via a first belt 34d4.

A rotation output section 34d5 of the first reduction gear mechanism 34d2 is provided with a connecting portion 34d6 to be fastened to the proximal link 34c by bolts (not shown). Thus the metacarpus link 34d and proximal link 34c are interconnected via a joint axis 34CS of the third joint 34C so that relative angle therebetween can vary.

The proximal link 34c is provided with a second electric motor 34c1, a second reduction gear mechanism 34c2 having a planetary gear reducer for reducing speed of the motor output and other components and a second encoder 34c3 for detecting rotation angle (joint angle) of the second joint 34B. The output shaft of the second motor 34c1, the input shaft of the second reduction gear mechanism 34c2 and the rotation shaft of the second encoder 34c3 are connected to each other via a second belt 34c4.

A rotation output section 34c5 of the second reduction gear mechanism 34c2 is provided with a connecting portion 34c6 to be fastened to the middle link 34b by bolts (not shown). Thus the proximal link 34c and the middle link 34b are interconnected via a joint axis 34BS of the second joint 34B so that relative angle therebetween can vary.

The middle link 34b is provided with a third electric motor 34b1, a third reduction gear mechanism 34b2 having a planetary gear reducer for reducing speed of the motor output and other components and a third encoder 34b3 for detecting rotation angle (joint angle) of the first joint 34A. The output shaft of the third motor 34b1, the input shaft of the third reduction gear mechanism 34b2 and the rotation shaft of the third encoder 34b3 are connected to each other via a third belt 34b4.

A rotation output section 34b5 of the third reduction gear mechanism 34b2 is bored with a pin hole 34b6. The distal link 34a is bored with a pin hole 34a1 corresponding to the pin hole 34b6. A pin (not shown) is inserted through the pin holes 34b6, 34a1 to connect the middle link 34b with the distal link 34a.

The middle link 34b is connected to the distal link 34a through an arm 34a2. One end of the arm 34a2 is rotatably attached to an appropriate position of the distal link 34a, while the other end thereof is rotatably attached to an appropriate position of the middle link 34b, such that the arm 34a2 is placed to be slanted with respect to the longitudinal direction of the second finger 34. The middle link 34b and distal link 34a are interconnected via two joint axes 34AS1, 34AS2 constituting the first joint 34A so that relative angle therebetween can vary.

An end of the distal link 34a is attached with a fingertip 34a3. The fingertip 34a3 is made of any type of resin materials or metallic materials such as aluminum. A surface of the fingertip 34a3 is fabricated with urethane, silicon rubber or the like.

The rotation output of the first motor 34d1 is transmitted through the first belt 34d4 to the first reduction gear mechanism 34d2 to rotate the third joint 34C about the joint axis 34CS, thereby changing the relative angle between the proximal link 34c and the metacarpus link 34d. The rotation output of the second motor 34c1 is transmitted through the second belt 34c4 to the second reduction gear mechanism 34c2 to rotate the second joint 34B about the joint axis 34BS, thereby changing the relative angle between the middle link 34b and the proximal link 34c. The rotation output of the third motor 34b1 is transmitted through the third belt 34b4 to the third reduction gear mechanism 34b2 to rotate the first joint 34A about the joint axis 34AS1, thereby changing the relative angle between the distal link 34a and the middle link 34b.

The third finger 36, fourth finger 38 and fifth finger 40 are structured similarly to the second finger 34. Three electric motors (not shown) installed in each finger are driven to rotate the first to third joints about their joint axes, thereby changing the relative angles of the links. The first finger 32 has the same structure as the second finger 34 except that the third joint and middle link are not equipped. Two electric motors (not shown) installed in the metacarpus link 32a and proximal link 32b are driven to rotate the first and second joints, thereby changing the relative angles of the links. As described above, in the hand 20, three or two motors installed in each of the fingers are driven to bend or extend the fingers so as to carry out the operation of grasping a work (external object) or the like.

The skin according to this embodiment will be explained. As shown in FIG. 3, the palm forming member 42 and the palm forming surface side of the first to fifth fingers 32 to 40 of the hand 20 are entirely covered by the skin 50.

FIG. 5(a) is a cross-sectional view schematically showing the structure of the skin 50.

As illustrated, the skin 50 comprises a plurality (a group) of, i.e., eight in the shown example, tactile sensors 52 installed on a base 50a, a first member 50b disposed on the tactile sensors 52, a second member 50c disposed on the first member 50b and a third member 50d disposed between the first member 50b and the tactile sensors 52.

In the example shown in FIG. 3, the base 50a corresponds to portions of the palm side of the fingertips and the middle links, proximal links etc. of the fingers, the palm surface (palm forming member 42) and the like. A top surface of the second member 50c is applied with a coating material 50e. The tactile sensor 52 is composed of conductive rubber 52a and an electrode member 52b.

Figure 5:
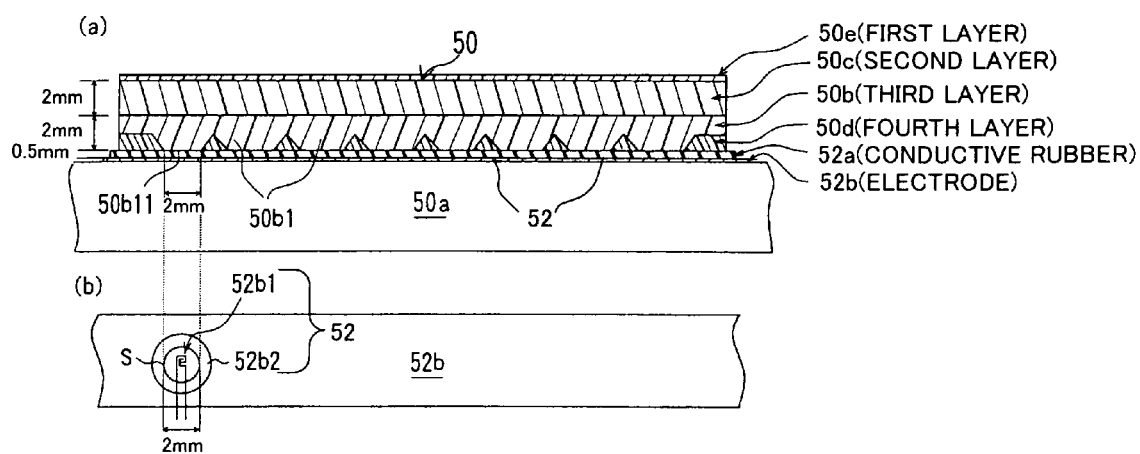
FIG. 5 is a cross-sectional view and plan view schematically showing the structure of the skin shown in FIG. 3 etc.

Explaining the structure shown in FIG. 5 (a) for each layer in order from the top side, the skin 50 comprises a first layer (coating material 50e), second layer (second member 50c), third layer (first member 50b), fourth layer (third member 50d), fifth layer (conductive rubber 52a of the tactile sensors 52) and sixth layer (electrode members 52b of the tactile sensors 52). When expressing the above in accordance with a human body, the first layer corresponds to a horny layer, the second layer an epidermis, the fourth layer a dermis, and the fifth and sixth layers a receptor.

Thus the skin 50 of the robot 10 according to this embodiment has the structure imitating skin tissue or a receptor of a human. As illustrated, the second layer has the thickness of 2 mm, the third layer (and the fourth layer) 2 mm, the fifth layer 0.5 mm, the sixth layer 0.1 mm, approximately, and the skin 50 has, therefore, the thickness of 4.6 mm or thereabout.

The sixth layer (electrode members 52b of the tactile sensors 52) specifically comprises flexible printed circuits having comb-type electrodes and wirings. FIG. 5 (b) is a plan view thereof. In the figure, a reference numeral 52b1 designates an electrode and a reference numeral 52b2 designates an area where the electrode is exposed, i.e., an area without an insulated layer.

The above-mentioned components will be explained for each. The first member 50b constituting the third layer is formed at its surface facing the tactile sensors 52, i.e., at its surface near the base 50a with a group of projections 50b1 that are tapered, precisely gradually tapered toward the respective tactile sensors 52 as viewed in cross-section.

The number of projections 50b1 is eight, i.e., the same as that of the tactile sensors 52. The projections 50b1 have a shape tapered toward the respective tactile sensors 52 as viewed in cross-section and are continuously formed to be capable of pressing each tactile sensor 52. Specifically, the each projection 50b1 has a tapered shape (i.e., a cone shape) and, as shown in FIG. 5 (a) (b), is provided at its end with a pressing portion 50b11 of an area S which is equal to or greater than the electrode 52b1 of the electrode member 52b of the tactile sensor 52.

Explaining the material next, the coating material 50e (first layer) is made of a "Surface coating material for human skin gel" (trade name), for instance. The second member 50c (second layer) is made of, for example, polyurethane, specifically a resin made from undiluted solution of urethane called a "Human skin gel: hardness O" (trade name) having the hardness of ShoreA0 (ultra-flexible urethane resin). The coefficient of friction of the coating material 50e is different from that of the material constituting the second member 50c.

Figure 6:
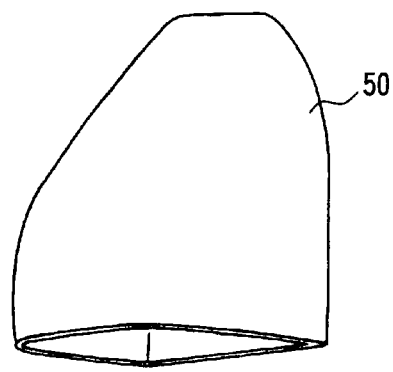
FIG. 6 is a perspective view showing an appearance of the skin at a fingertip region of the finger shown in FIG. 4.

FIG. 6 is a perspective view showing an appearance of the skin 50 at the fingertip 34a region of the finger 34. As illustrated, the surface of the skin 50 gives the smooth appearance. Although not shown in the drawing, the skin 50 of the palm forming member 42 of the metacarpus 30 etc. also gives the smooth appearance.

The first member 50b (third layer) is made of, for example, polyurethane, more specifically a "Hei-Cast 3400" (trade name) which is a resin having the hardness of ShoreA90, low viscosity and good hardening property.

The third member 50d (fourth layer) is made of, for example, polyurethane, more specifically a resin having the hardness of ShoreA0 the same as the second member 50c (second layer). In other words, the third member 50d located between the first member 50b (third layer) and the tactile sensors 52 (fifth and sixth layers) is fabricated of a resin (material) that is lower in rigidity than a resin (material) making up the first member (third layer).

The fifth layer, i.e., the conductive rubber 52a of the tactile sensors 52 is made of a material that is made by incorporating conductive powder such as carbon powder in insulated rubber. When the conductive rubber material is compressed in response to a load, it changes the density of the conductive powder inside and lowers a resistance value of the conductive rubber.

It should be noted that, although an example of the skin 50 is disclosed in which the tactile sensors 52 are disposed laterally in one line as shown in FIG. 5, it is not limited thereto. Specifically, the configuration shown in FIG. 5 can be successively placed in a longitudinal direction such that the tactile sensors 52 are continuously allocated horizontally and vertically in the matrix. It will be explained later.

Next, the detecting operation of the tactile sensors 52 will be explained.

Figure 7:
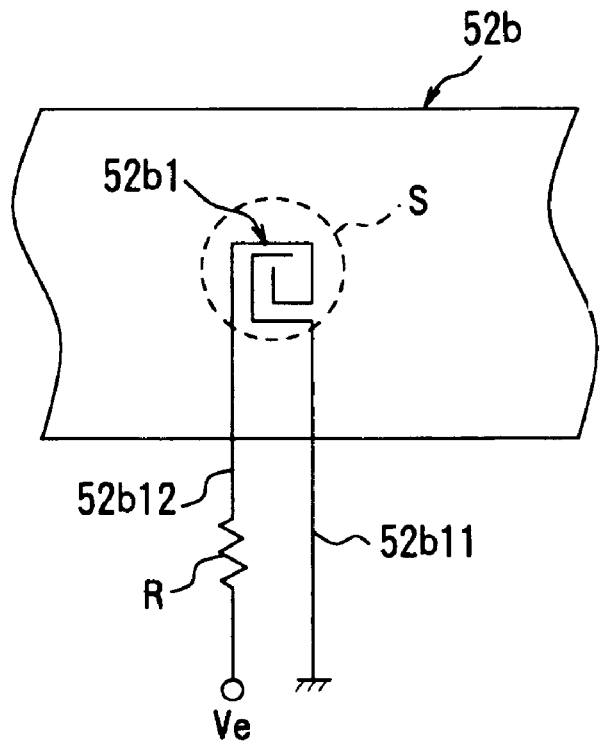
FIG. 7 is an explanatory view schematically showing the structure of an electrode of a tactile sensor shown in FIG. 5.

FIG. 7 is an explanatory view schematically showing the structure of the electrode 52b1 of the tactile sensor 52. As shown in FIG. 7, the electrode 52b1 is composed of two electric wires 52b11, 52b12 positioned slightly apart from each other. The electric wire 52b11 is grounded and the electric wire 52b12 is connected to a power source Ve through a resistor R.

Figure 8:
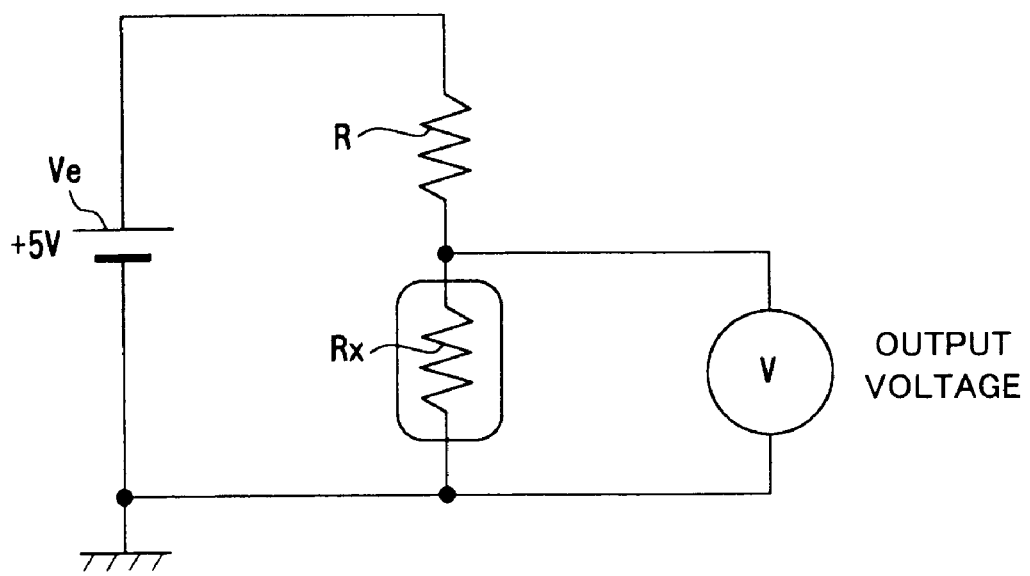
FIG. 8 is a circuit diagram of a detection circuit of the tactile sensor utilizing the electrode shown in FIG. 7.

FIG. 8 is a circuit diagram of a detection circuit of the tactile sensor 52 utilizing the electrode shown in FIG. 7.

In the illustrated detection circuit, the conductive rubber 52a is pressed by the pressing portion 50b11 of the projection 50b1 in response to an applied load and as a resistance value thereof lowers, a value of current flowing between the two electric wires 52b11, 52b12 varies, resulting in change of the voltage across the resister. Therefore, a load or load distribution generated due to a contact with an external object such as a work can be reliably detected by calculating the output voltage based on the change, thereby enabling to reliably estimate a point in contact with the external object. The output voltage V is calculated in accordance with the following formula.

$$V = Ve \times \{Rx/(R+Rx)\} [V]$$

In the foregoing, the greater the voltage-dividing resistance of the resistor R is, the higher the detection sensitivity becomes. In this embodiment, it is configured such that a load up to 1[N] or thereabout can be detected, the material of the first member 50b is selected as explained above taking the noise immunity into account, and the resistance value thereof is set to, e.g., 33 [kΩ]. Further, since the detection sensitivity differs depending on the hardness of the second member 50c (second layer) or the third member 50d (fourth layer) in addition to the hardness of the first member 50b (third layer), the materials thereof are selected as explained taking the detection sensitivity into account.

Next, the detection accuracy of the tactile sensors 52 according to this embodiment will be explained.

As mentioned above, in order to reliably detect a load applied to the soft second member 50c (second layer), it is necessary to make a load act on the tactile sensors 52 without spreading. In this embodiment, since it is configured to have the first member 50b (third layer) formed with the projections 50b1 each having a cone shape (which is tapered as viewed in cross-section) on the tactile sensors 52, when a load is applied, the generated internal stress can be concentrated on the tactile sensors 52.

Figure 9:
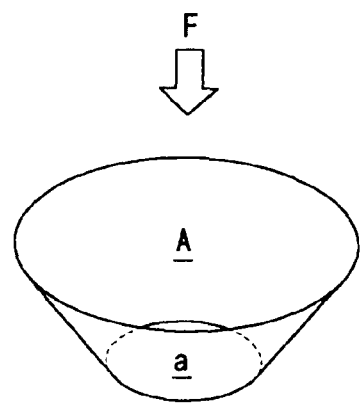
FIG. 9 is an explanatory view schematically showing the structure of one projection of the skin shown in FIG. 5.

The explanation will be made on this factor. In FIG. 9, an area of the upper surface of the cone is assigned by A, an area of the bottom surface thereof by a and a load by F. A surface pressure P received by the area A is P=F/A and a surface pressure p received by the area a is p=F/a. In the case of A=5×a, for instance, it leads to p=F/(A/5)=(5·F)/A. Specifically, since a receives a fivefold surface pressure compared to A, the internal stress generated by the load F can be surely concentrated on the electrode 52b1 of the tactile sensor 52.

Figure 10:
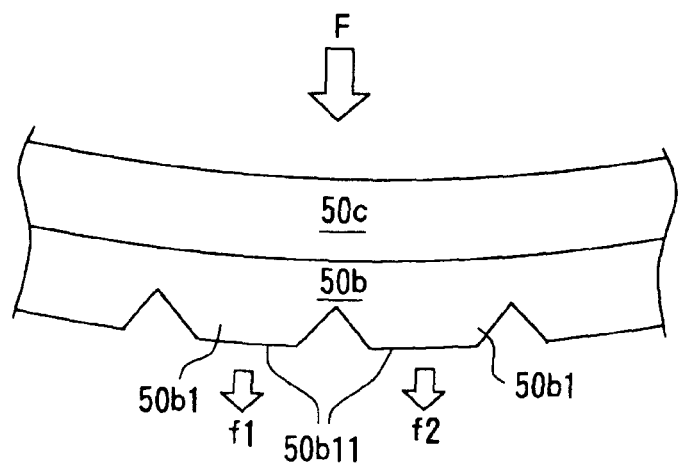
FIG. 10 is a similar explanatory view schematically showing the structure of the projections and the like of the skin shown in FIG. 5.

Realistically, it is impossible to dispose innumerable tactile sensors 52, so a finite number of tactile sensors 52 are allocated discretely, i.e., positioned at appropriate intervals. However, if a dead zone is generated, it deteriorates the detection accuracy. Yet, in this embodiment, since it is configured such that the tapered projections 50b1 are continuously formed to be capable of pressing the respective tactile sensors 52, the load F applied to a position between one tactile sensor 52 and adjacent tactile sensor 52 can be divided into loads f1 and f2 to be distributed to the two tactile sensors 52, as shown in FIG. 10. For instance, when it is assumed that the load F is 100%, it can be divided into f1 and f2 each at 50%.

Further, based on the distribution condition, it is possible to detect a point to which a load is applied between the sensors. In particular, when a uniform load (pressure) is applied, a contact point can be reliably or accurately estimated from the output voltage of the tactile sensors 52.

Figure 11:
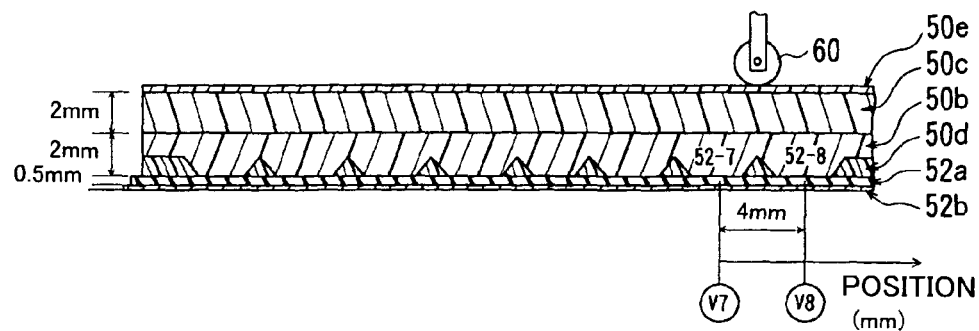
FIG. 11 is an explanatory view showing a condition where a roller is moved as applying a certain load to the skin shown in FIG. 5 etc.
Figures 12, 13:
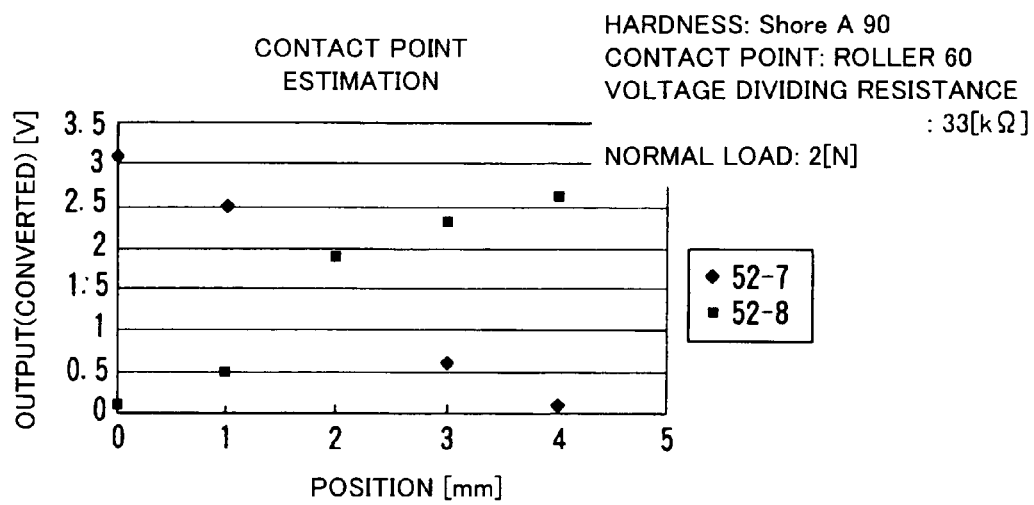
FIG. 12 is a table showing output voltages of the sensors under the condition shown in FIG. 11 and contact points estimated based thereon.
FIG. 13 is a graph showing the values of FIG. 12 by plotting them.

Explaining about this, as shown in FIG. 11, it is assumed the case where a roller 60 with a radius 16 mm is moved from left to right in the figure, as applying a constant load 2 [N] onto the skin 50 by the roller 60. FIG. 12 is a table showing the output voltages and contact points estimated based thereon.

In FIG. 11, a condition in which the roller 60 is moved from, as counted from the left, the seventh tactile sensor 52-7 to the eighth tactile sensor 52-8 is considered. When the output voltage of the tactile sensor 52-7 is V7 and that of the tactile sensor 52-8 is V8, since the width of the tactile sensor 52 in the moving direction is 4 mm, a position x [mm] of the roller 60 can be calculated using the formula shown at the bottom of FIG. 12.

Based on the calculation result, therefore, it is possible to estimate whether the roller 60 is located above the tactile sensor 52-7, above the tactile sensor 52-8, or at the midpoint (middle point) therebetween. A contact point other than those can be calculated by interpolation. FIG. 13 is a graph showing the values of FIG. 12 by plotting them.

As described in the foregoing, the skin 50 of the robot 10 according to this embodiment is configured to comprise a plurality of the tactile sensors 52 discretely installed on the base 50a, the first member 50b that is disposed on the tactile sensors 52, the first member being continuously formed at its surface facing the tactile sensors with the projections 50b1 which are tapered toward the respective tactile sensors as viewed in cross-section to be capable of pressing each tactile sensor, and the second member 50c that is disposed on the first member and is made of a material being lower in rigidity than a material of the first member. With this, the skin 50 is equipped with the second member 50c as a soft skin surface and it becomes possible to reliably detect a point of action or distribution of a load applied through the skin surface, thereby enabling to reliably estimate a point in contact with an external object.

Further, since it is configured to have the second member (skin surface) 50c, it becomes possible to mitigate impact caused by a contact with an external object. In addition, an area in contact can be enlarged, thereby facilitating grasping of a work (external object) when the skin is used for the hand 20 or the like.

Further, since it is configured such that the projections 50b1 are each provided at its end with the pressing portion 50b11 of the area S which is equal to or greater than an area of the electrode 52b1 of the tactile sensor 52, in addition to the above-mentioned effects, it becomes possible to press the entire electrode 52b1 of the tactile sensor 52 even when displacement occurs to some extent, thereby enabling to further reliably detect a load.

Further, it is configured such that each of the projections 50b1 has a cone shape as viewed in cross-section. Since there does not exist a ridge line on which stress tends to be concentrated when a load is applied to the second member 50c disposed on the first member 50b, in addition to the above-mentioned effects, the generated internal stress can be further surely concentrated on the tactile sensors 52.

Further, it is configured to comprise the third member 50d made of a material being lower in rigidity than the material of the first member and installed between the first member 50b and the tactile sensors 52. Since the press onto the tactile sensors corresponding to the projections is not disturbed, in addition to the above-mentioned effects, the stress (load) concentration through the projections can be further ensured.

Further, since it is configured such that a top surface of the second member 50c is applied with the coating material 50e that differs in coefficient of friction from the material of the second member, in addition to the above-mentioned effects, it becomes possible to easily change the coefficient of friction of the outer surface of the skin 50.

Second Embodiment

Figure 14:
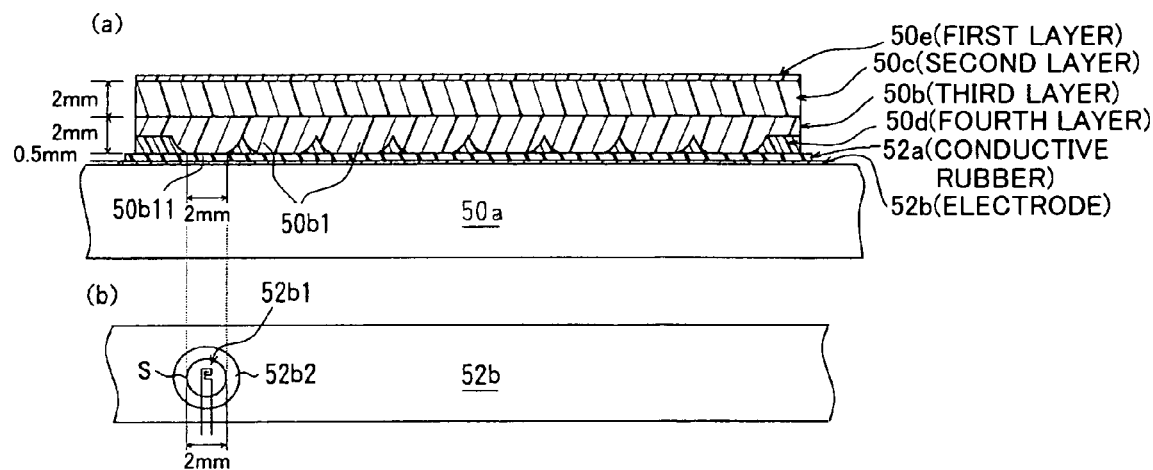
FIG. 14 is a cross-sectional schematic view similar to FIG. 5, but showing a robot skin according to a second embodiment of this invention.

FIG. 14 is a cross-sectional schematic view similar to FIG. 5, but showing a robot skin according to a second embodiment of this invention.

Although in the first embodiment, the projection 50b1 of the first member 50b has a tapered shape, precisely a cone shape, in the second embodiment, it instead has a hemisphere shape. Owing to this configuration, since there does not exist a ridge line on which stress tends to be concentrated when a load is applied to the second member 50c disposed on the first member 50b, the generated internal stress can be further surely concentrated on the tactile sensors 52.

The remaining configuration and effects are the same as those in the first embodiment. It should be noted that the shape of the projection 50b1 is not limited thereto and it suffices if it is a tapered shape with no ridge line as viewed in cross-section. The remaining configuration and effects are the same as those in the first embodiment.

Third Embodiment

Figure 15:
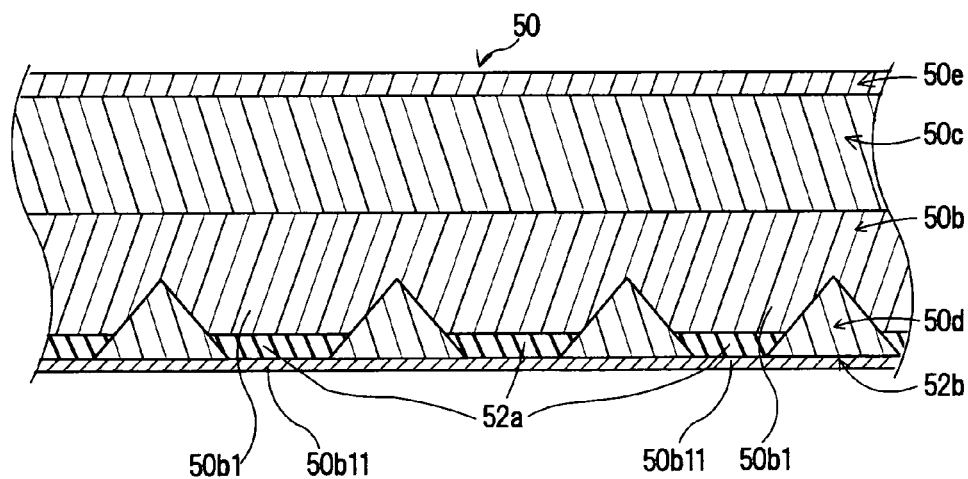
FIG. 15 is a cross-sectional schematic view similar to FIG. 5, but showing a robot skin according to a third embodiment of this invention.

FIG. 15 is a cross-sectional schematic view similar to FIG. 5, but showing a robot skin according to a third embodiment of this invention.

The explanation will be made with focus on points of difference from the foregoing embodiments. In the robot skin 50 according to the fourth embodiment, it is configured such that the pressing portion 50b11 of the projection 50b1 of the first member 50b, i.e., a portion containing the pressing portion 50b11 is made of a conductive rubber material (conductive rubber 52). The remaining configuration is the same as that in the foregoing embodiments.

With this, in addition to the effects described in the foregoing embodiments, the skin 50 according to the third embodiment can be low in height and, therefore, the structure can be compact by this amount. It should be noted that although only the portion containing the pressing portion 50b11 is configured to be made of the conductive rubber 52, the entire projection 50b1 or the entire first member 50b can be made of the conductive rubber 52.

Fourth Embodiment

Figure 16:
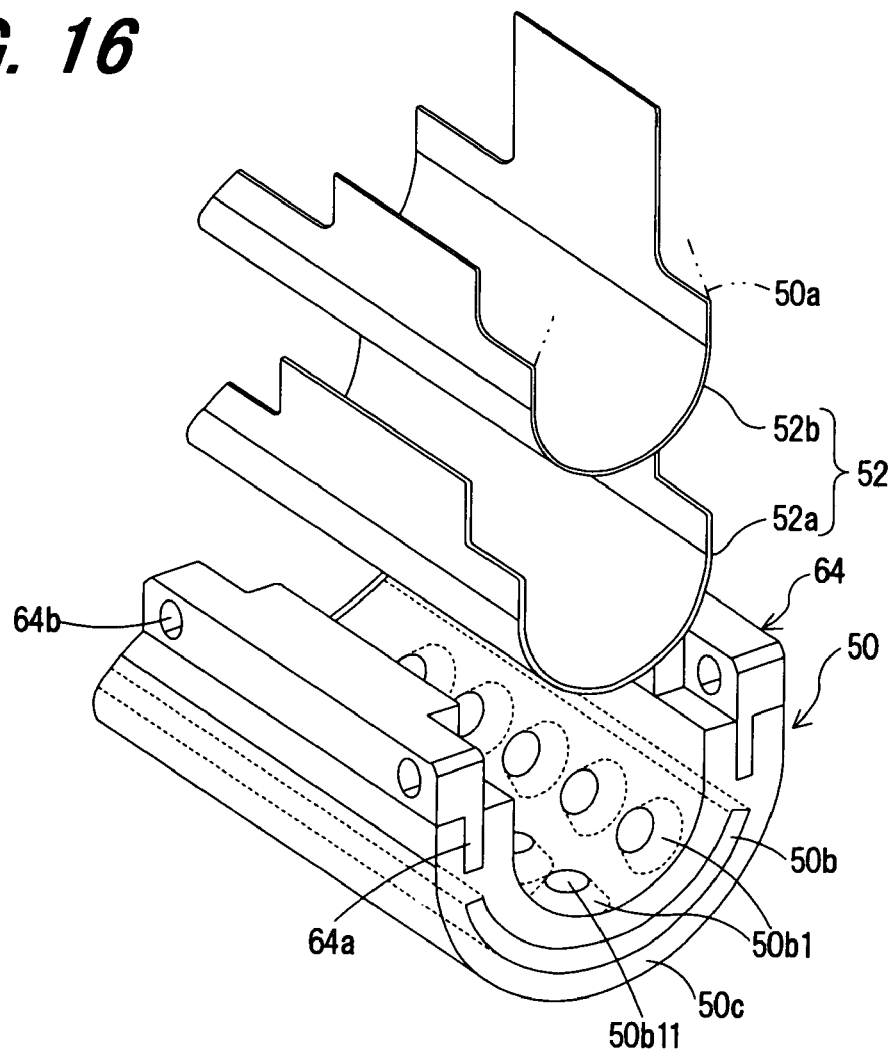
FIG. 16 is a schematic perspective view of a robot skin according to a fourth embodiment of this invention.
Figure 17:
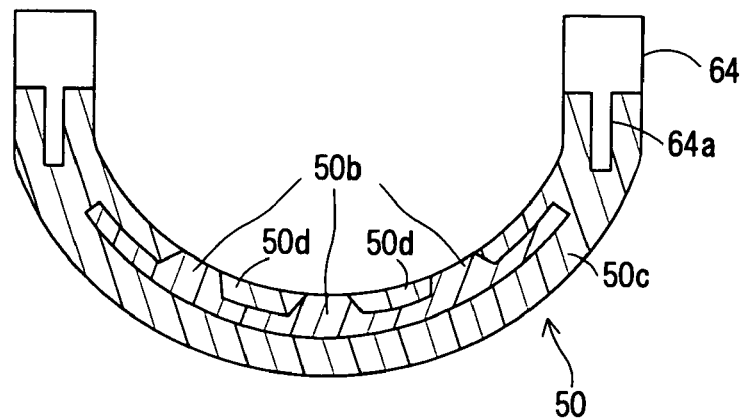
FIG. 17 is a cross-sectional view of the robot skin shown in FIG. 16 according to the fourth embodiment.

FIG. 16 is a schematic perspective view of a robot skin according to a fourth embodiment of this invention and FIG. 17 is a cross-sectional view thereof.

The skin 50 can be disposed not only at a flat place but at a rounded or curved place. As described, when being disposed at the fingertip region, the middle link, i.e., finger pad, or the like, the skin 50 having the tactile sensors 52 that are continuously allocated horizontally and vertically in the matrix is disposed along the curved shape of the finger pad.

Such the skin will be explained in the fourth embodiment. Specifically, it is configured such that the skin 50 is disposed at the middle link 34b and the like of the second finger 34 shown in FIG. 4. In FIGS. 16 and 17, the surface is directed downward opposite to the case in FIG. 5.

As illustrated, similarly to the first embodiment, the skin 50 is configured to comprise a plurality of the tactile sensors 52 discretely installed with respect to the base 50a, the first member 50b (third layer) that is continuously formed at its surface facing the tactile sensors 52 with the projections 50b1 which are tapered toward the respective tactile sensors 52 as viewed in cross-section to be capable of pressing each tactile sensor 52, the second member 50c (second layer) that is made of a material being lower in rigidity than a material of the first member and surrounds the first member for supporting, and a fixture 64 that fixes the second member 50c to the base 50a. The conductive rubber 52a and electrode member 52b are installed on the first member 50b. In FIG. 16 etc., the coating material (first layer) is not illustrated.

In the skin 50 according to the fourth embodiment, the skin 50 and the base 50a have a curved shape as viewed from the side and, therefore, the first member 50b and the like also have a curved shape as viewed from the side. The projections 50b1 having the pressing portions 50b11, i.e., the tactile sensors 52 formed in the first member 50b are discretely allocated at predetermined intervals.

The second member 50c surrounds the first member 50b for supporting, i.e., surrounds portions other than the pressing portions 50b11 of the projections 50b1 for supporting, and is fixed to the base 50a via the fixture 64. Specifically, the fixture 64 is equipped with a rib 64a and holes 64b and the rib 64a is buried in the second member 50c, while the fixture 64 is screwed to the base 50a through the holes 64b, thereby fixing the second member 50c to the base 50a.

Figure 18:
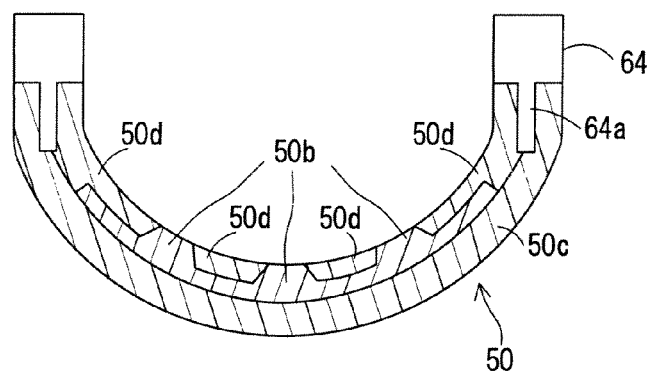
FIG. 18 is a cross-sectional view of the robot skin, similarly to FIG. 17.

The materials of the first member 50b and second member 50c are the same as those in the first embodiment. The fixture 64 is made of, for instance, polycarbonate. It should be noted that in the fourth embodiment, as shown in FIG. 18, the third member 50d can be installed on the side of the projections 50b1 of the first member 50b as in the first embodiment.

Figure 19:
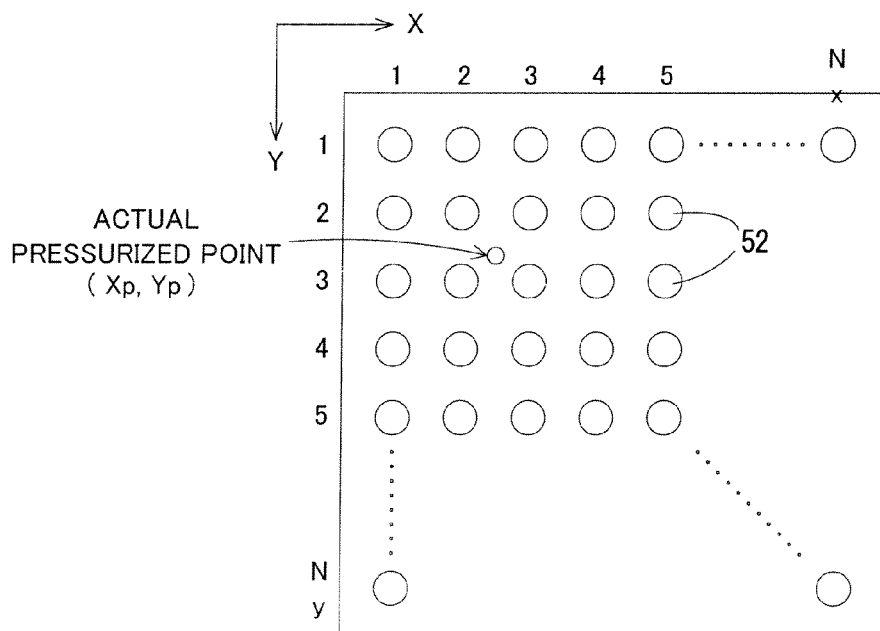
FIG. 19 is an explanatory view for explaining the processing to estimate an actual pressurized point (contact point) based on an external force applied to the tactile sensors shown in FIG. 16.

As shown in FIG. 19, the tactile sensors 52 are continuously allocated horizontally and vertically in the matrix. The explanation will be made on the processing to estimate an actual pressurized point (contact point) based on an external force applied to the tactile sensors 52.

When a position of each tactile sensor 52 is expressed as a coordinate (Pi, Pj) and its output is expressed as Fij, the actual pressurized point (Xp, Yp) can be calculated in accordance with the formula shown at the bottom of FIG. 19, as known. Specifically, a point (position) on which the actual pressure acts can be calculated from a quotient obtained by dividing a product of a position P and a force F by the force F.

As described in the foregoing, the skin 50 according to the fourth embodiment is configured to comprise a plurality of the tactile sensors 52 discretely installed with respect to the base 50a, the first member 50b that is continuously formed, at its surface facing the tactile sensors 52, with the projections 50b1 which are tapered toward the respective tactile sensors 52 as viewed in cross-section to be capable of pressing each tactile sensor 52, the second member 50c that is made of a material being lower in rigidity than a material of the first member 50b and surrounds the first member 50b for supporting, and the fixture 64 that fixes the second member 50c to the base 50a. With this, similarly to the first embodiment, when a load is applied to the second member 50c, the generated internal stress can be concentrated on a sensing point of the tactile sensor 52 through the first member 50b that is formed with the projections which are tapered toward the respective tactile sensors 52 as viewed in cross-section, thereby enabling to reliably estimate a point in contact with an external object.

Further, since it is configured to have the second member 50c that surrounds the first member 50b for supporting and the fixture 64 that fixes the second member 50c to the base 50a, the second member 50c can be firmly fastened to the base 50a, while a certain degree of freedom can be provided to the first member 50b with respect to the base 50a.

Further, similarly to the first embodiment, since it is configured to have the second member 50b, it becomes possible to mitigate impact caused by a contact with an external object. In addition, an area in contact can be enlarged, thereby facilitating grasping of a work (external object) when the robot 10 is a humanoid robot having a human shape and the skin is used for the hand 20 or the like. Specifically, when a work is large, by holding along the surface of the work and when a work is small, by wrapping, the hand can surely grasp the work. Furthermore, since the second member 50c is made of a material being lower in rigidity than a material of the first member 50b, it increases a contact area, thereby further reliably grasping an object.

Fifth Embodiment

Figure 20:
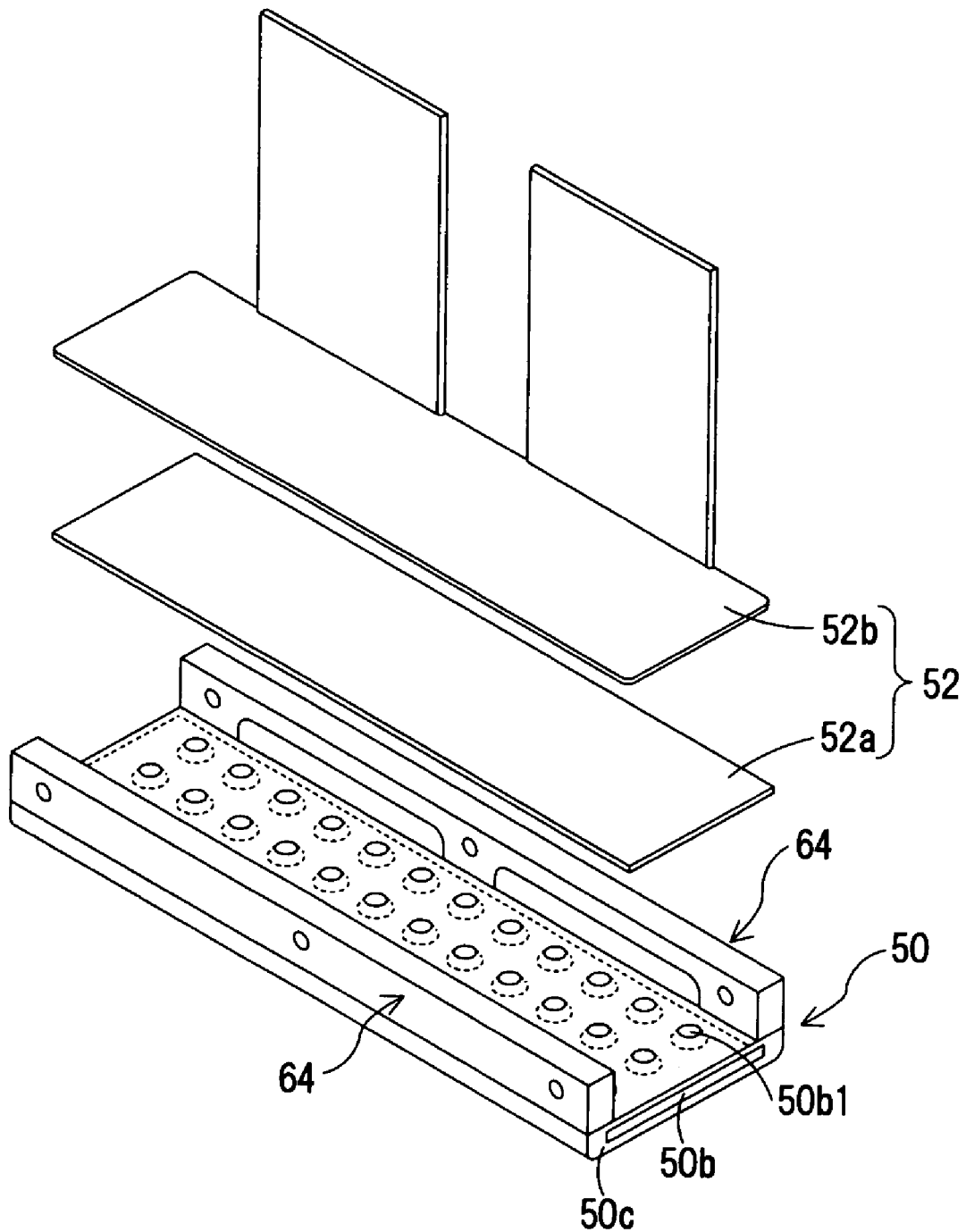
FIG. 20 is a schematic perspective view of a robot skin according to a fifth embodiment of this invention.

FIG. 20 is a schematic perspective view of a robot skin according to a fifth embodiment of this invention.

The flat skin 50 is explained in the fifth embodiment, similarly to the first embodiment. As illustrated, similarly to the fourth embodiment, the skin 50 is configured to comprise a plurality of the tactile sensors 52 discretely installed with respect to the base (not shown), the first member 50b (third layer) that is continuously formed, at its surface facing the tactile sensors 52, with the projections 50b1 which are tapered toward the respective tactile sensors 52 as viewed in cross-section to be capable of pressing each tactile sensor 52, the second member 50c (second layer) that is made of a material being lower in rigidity than a material of the first member and surrounds the first member for supporting, and a fixture 64 that fixes the second member 50c to the base 50a. The conductive rubber 52a and electrode member 52b are installed on the first member 50b.

The fifth embodiment has the same configuration as the fourth embodiment except that the first member 50b and the like are flat, and the effects are also the same.

In the fourth and fifth embodiments, the tactile sensors 52 are discretely allocated at predetermined intervals. This characteristic and a shape of the sensor 52 are further explained in detail.

Figure 21:
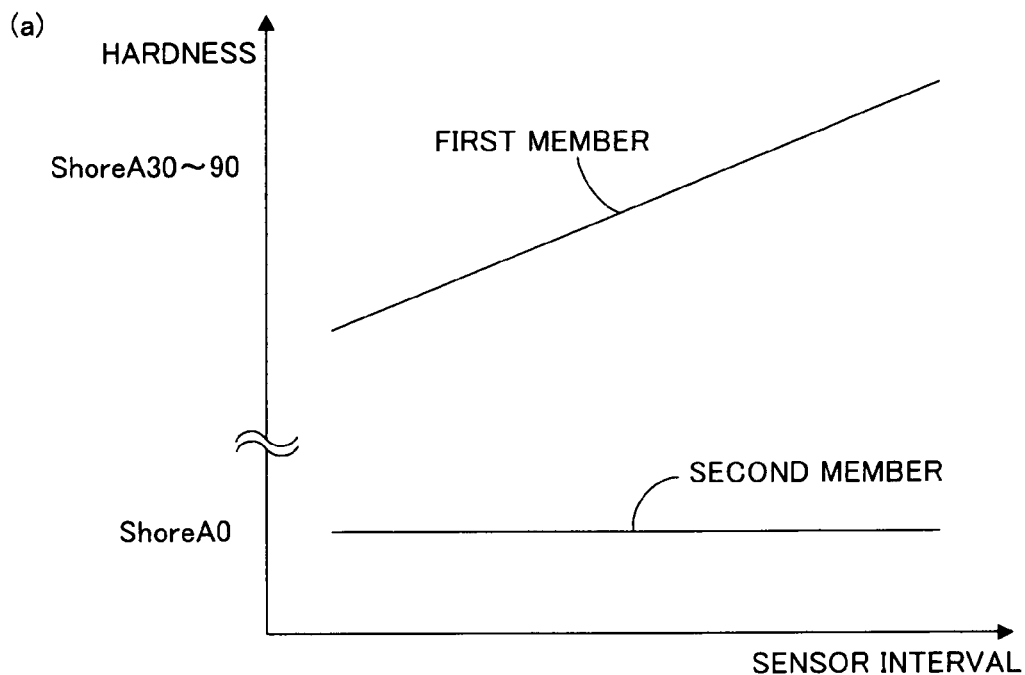
FIG. 21 is a set of a graph and a diagram showing the relationship of a distance between the tactile sensors with hardness of a first member or the like in the fourth and fifth embodiments.
Figure 21:
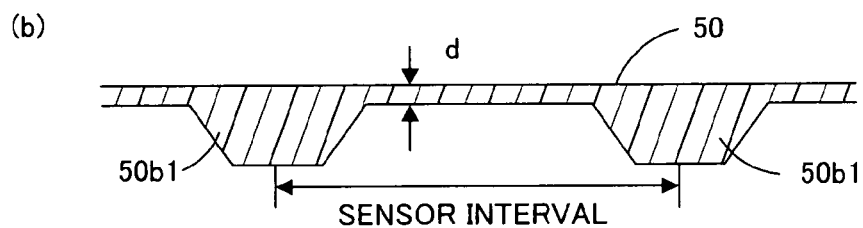

FIG. 21(*a*) is a graph showing the relationship of an interval (distance) between the tactile sensors 52 with hardness of the first member 50b or the like. In the fourth and fifth embodiments, as shown, it is preferable to increase the hardness of the first member 50b as the distance between the tactile sensors 52 increases in order to enhance the strength of the first member 50b. Although the same purpose can be achieved by increasing the hardness of the second member 50c, it suffices if the hardness of the first member 50b increases, and the second member 50c can be kept at a desired hardness.

It should be noted that, as shown in FIG. 21(*b*), instead of hardness, the thickness d of a portion connecting the adjacent projections 50b1 of the first member 50b may be increased as the distance between the tactile sensors 52 increases.

Figure 22:
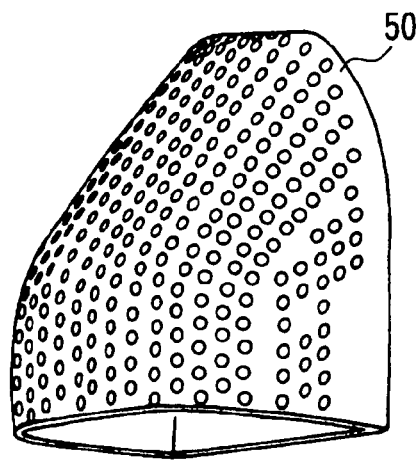
FIG. 22 is a perspective view of a robot skin similar to FIG. 6, but showing an alternative example.

It should also be noted that, although, in the first to fifth embodiments, it is configured such that the surface of the skin 50 is flat, as shown in FIG. 22, dimples can instead be formed. Specifically, the skin 50 may have the dimpled appearance with the surface (top surface) of the second member 50c being formed with the dimples and the coating material 50e being applied thereto. This structure can achieve the high coefficient of friction, thereby further facilitating grasping of a work or the like.

Figure 23:
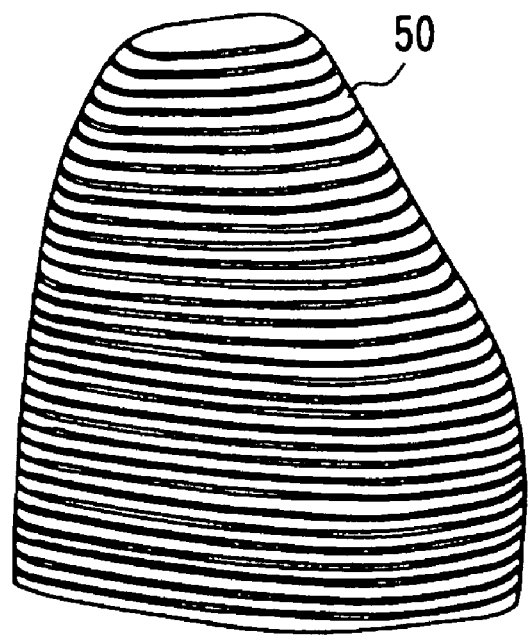
FIG. 23 is an explanatory view similar to FIG. 22, but showing another alternative example of a robot skin.
Figure 24:
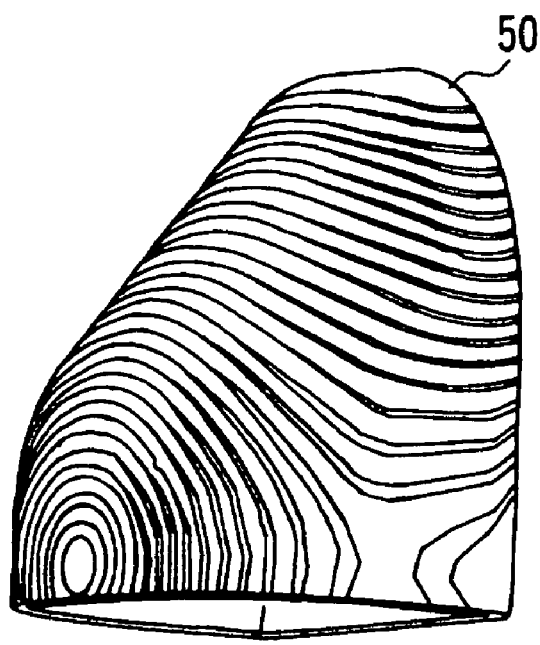
FIG. 24 is an explanatory view similar to FIG. 22, but showing another alternative example of a robot skin.

Further, instead of the dimples, the striped pattern formed of numerous evenly spaced linear grooves shown in FIG. 23 or the human fingerprint pattern formed of numerous curved grooves shown in FIG. 24 can be adapted. Furthermore, the skin 50 may have an irregular surface of any other type, such as a knurled surface.

Further, although the materials and hardness of the skin 50 are explained with the specific names or values in the foregoing, they are only examples and other materials or hardness can be applied.

It should further be noted in the foregoing that, although a biped humanoid mobile robot is taken as an example of the robot 10, the robot is not limited thereto.

INDUSTRIAL APPLICABILITY

According to this invention, in the robot skin, it is configured to comprise a plurality of tactile sensors discretely installed on a base, a first member that is disposed on the tactile sensors, the first member being continuously formed, at its surface facing the tactile sensors, with projections which are tapered toward the respective tactile sensors as viewed in cross-section to be capable of pressing the tactile sensor, and a second member that is disposed on the first member and is made of a material being lower in rigidity than a material of the first member. With this, the robot skin is equipped with the second member as a soft skin surface and it becomes possible to reliably detect a point of action or distribution of a load applied through the skin surface, thereby enabling to reliably estimate a point in contact with an external object. Further, since it is configured to have the second member (skin surface), it becomes possible to mitigate impact caused by a contact with an external object and an area in contact can be enlarged, thereby facilitating grasping of a work (external object) when the robot is a humanoid robot having a human shape and the skin is used for the hand or the like.

The invention claimed is:

1. A skin of a robot, comprising:
a plurality of tactile sensors discretely installed on a base;
a first member disposed on the tactile sensors, the first member being continuously formed, at its surface facing the tactile sensors, with a plurality of projections which are tapered toward the respective tactile sensors as viewed in cross-section, the projections configured to press each of the tactile sensors; and
a second member that is disposed on the first member and is made of a material being lower in rigidity than a material of the first member.

2. The skin according to claim 1, wherein the projections are each provided at its end with a pressing portion of an area which is equal to or greater than that of an electrode of each of the tactile sensors.

3. The skin according to claim 2, wherein each of the projections has a cone shape or a hemisphere shape.

4. The skin according to claim 1, wherein each of the projections has a cone shape or a hemisphere shape.

5. The skin according to claim 1, wherein a third member made of a material being lower in rigidity than the material of the first member is installed between the first member and the tactile sensors.

6. The skin according to claim 1, wherein a top surface of the second member is applied with a coating material that differs in coefficient of friction from the material of the second member.

7. The skin according to claim 1, wherein a pressing portion of the projection is made of a conductive rubber material.

* * * * *